US008532462B2

(12) United States Patent
Ramamurthy et al.

(10) Patent No.: US 8,532,462 B2
(45) Date of Patent: Sep. 10, 2013

(54) NON-DESTRUCTIVE FILE BASED MASTERING FOR MULTIPLE LANGUAGES AND VERSIONS

(75) Inventors: Arjun Ramamurthy, Glendale, CA (US); Geoffrey A. Bloder, Los Angeles, CA (US); Raymond Yeung, Los Angeles, CA (US)

(73) Assignee: Twentieth Century Fox Film Corporation, Los Angeles, CA (US)

( * ) Notice: Subject to any disclaimer, the term of this patent is extended or adjusted under 35 U.S.C. 154(b) by 289 days.

(21) Appl. No.: 12/947,642

(22) Filed: Nov. 16, 2010

(65) Prior Publication Data

US 2011/0116764 A1 May 19, 2011

Related U.S. Application Data

(60) Provisional application No. 61/261,653, filed on Nov. 16, 2009.

(51) Int. Cl.
*H04N 5/92* (2006.01)

(52) U.S. Cl.
USPC ................................. 386/245; 386/E5.003

(58) Field of Classification Search
USPC .................. 705/14.68; 725/28; 386/4, 279, 386/95; 348/180; 707/100; 375/240.13
See application file for complete search history.

(56) References Cited

U.S. PATENT DOCUMENTS

| 5,732,184 | A * | 3/1998 | Chao et al. .................... 386/282 |
| 7,376,338 | B2 | 5/2008 | Kim et al. |
| 7,966,218 | B1 * | 6/2011 | Fish ............................. 705/14.68 |
| 2002/0031262 | A1 | 3/2002 | Imagawa et al. |
| 2003/0001880 | A1 * | 1/2003 | Holtz et al. .................... 345/716 |
| 2005/0278729 | A1 | 12/2005 | Lamkin et al. |

(Continued)

FOREIGN PATENT DOCUMENTS

| JP | 2008-125102 | 5/2008 |
| JP | 2009-217332 | 9/2009 |
| KR | 10-2009-0097750 | 9/2009 |
| WO | 2009-073583 | 6/2009 |

OTHER PUBLICATIONS

International Search Report, International application No. PCT/US10/56889, International filing date Nov. 16, 2010, Date of mailing Jan. 15, 2011.

(Continued)

*Primary Examiner* — Thai Tran
*Assistant Examiner* — Nien-Ru Yang
(74) *Attorney, Agent, or Firm* — Gates & Cooper LLP

(57) ABSTRACT

A method, system, apparatus, article of manufacture, and computer program product provide the ability to non-destructively generate a file based master. A domestic source (having domestic audio and video content) with textless content (have portions of the domestic source that is devoid of text) is obtained. A localized source (e.g., localized audio-video) based on the domestic source is received. The localized video is compared to the domestic source to determine differences. The localized video is bladed and realigned with the domestic source. Metadata (of the differences) is transposed onto the domestic source. Texted portions in the domestic source are obscured with corresponding portions of the textless content. Texted material (based on the localized video and texted portions) is created. The localized video content and the textless content are discarded. The domestic source, localized audio content, created texted material; and metadata are combined into a playlist that represents a localized file based master.

21 Claims, 9 Drawing Sheets

(56) References Cited

U.S. PATENT DOCUMENTS

| | | | |
|---|---|---|---|
| 2007/0282868 A1* | 12/2007 | Wanigasekara-Mohotti et al. | 707/100 |
| 2008/0010648 A1 | 1/2008 | Ando et al. | |
| 2009/0128633 A1* | 5/2009 | Chapman | 348/180 |
| 2009/0226149 A1* | 9/2009 | Shibata et al. | 386/95 |
| 2010/0011392 A1* | 1/2010 | Bronstein et al. | 725/28 |
| 2010/0067863 A1* | 3/2010 | Wang et al. | 386/4 |
| 2011/0038611 A1* | 2/2011 | Gianutsos et al. | 386/279 |

OTHER PUBLICATIONS

International Search Report for PCT Application No. PCT/US2011/049971 filed on Aug. 31, 2011.

* cited by examiner

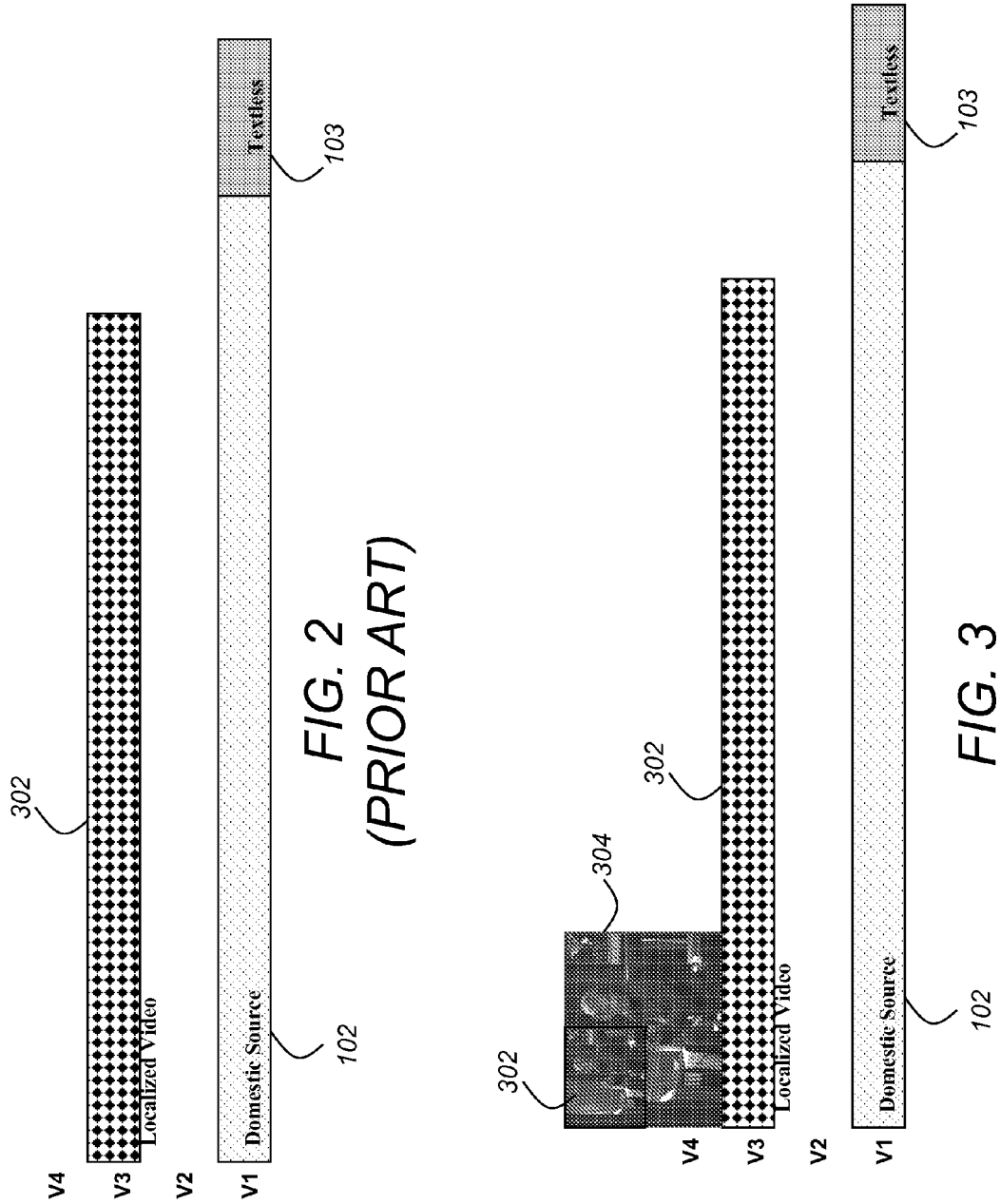

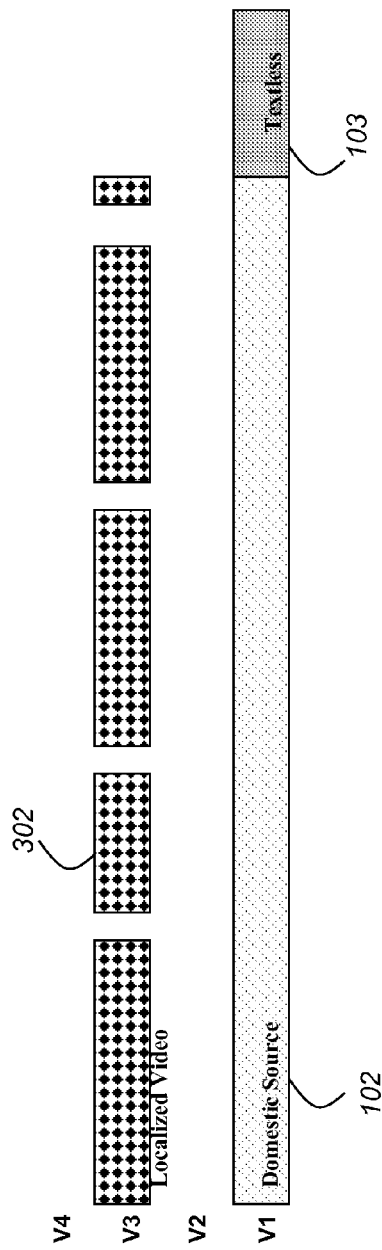
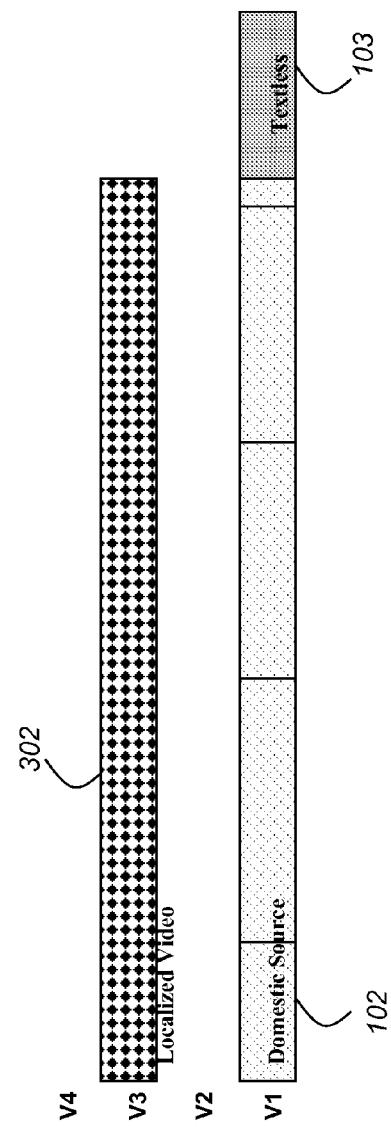

NON-DESTRUCTIVE FILE BASED MASTERING FOR MULTIPLE LANGUAGES AND VERSIONS

This application claims the benefit under 35 U.S.C. Section 119(e) of the following commonly-assigned U.S. provisional patent application(s), which is/are incorporated by reference herein: Provisional Application Ser. No. 61/261,653, filed on Nov. 16, 2009, by Arjun Ramamurthy and Geoffrey A. Bloder, entitled "NON-DESTRUCTIVE FILE BASED MASTERING FOR MULTIPLE LANGUAGES AND VERSIONS,".

This application is related to the following commonly-assigned patent application, which application is incorporated by reference herein:

U.S. Patent Application Ser. No. 61/378,787, filed on Aug. 31, 2010, by Elaine M. Spooner, John D. Koscheka, Michael S. Bessolo, J. Craig D. Russell, Greg McCarthy, Venkata Nagaraju Mantena, Ramesh Gurram, and Marwan Ammar, entitled "Localized Media Content Editing,".

BACKGROUND OF THE INVENTION

1. Field of the Invention

The present invention relates generally to audio-video processing, and in particular, to a method, apparatus, and article of manufacture for the file based mastering/creation of localized audio-video in multiple languages and versions from the domestic version in a non-destructive fashion.

2. Description of the Related Art

Media content (e.g., that includes audio and video), that was originally created domestically, is often delivered to international broadcasters in the local language, with local language subtitles and captions. For many years, media content (e.g., television shows, movies, etc.) has been delivered via broadcast standard video tapes to the local territories, and the localized versions have been generated in territory, by either content owner affiliates or designated post facilities, for the designated broadcast standard (e.g., NTSC [national television system committee], PAL [phase alternating line], etc). The content owner may then be returned the localized version, which may be resupplied to other broadcast entities in that territory. This resupply traditionally has required the shipment of broadcast tapes, or the digitization of said broadcast tapes and shipment of files.

To utilize content created domestically in the United States (or in English), international clients (or content owner affiliates or designated post facilities), often manually edit the domestic audio and video based on the foreign territory's local criteria to create their own localized version. Thus, localized versions have been edited for content—commercial breaks, blacks, etc. may be pulled or reformatted, texted shots (such as overlays) may be translated and recreated, and localized credits (e.g., end credits) may be created. For example, all commercials may be removed for an Italian version of a television program and played sequentially upon the conclusion of the program.

Accordingly, the localized version of content includes audio and video that have been edited together. Further yet, the localized content that has been created is specific to a particular broadcast standard. For example, an Italian master may be created in standard definition PAL 4×3 aspect ratio, as that is the prevalent broadcast standard. However, it may be desirable to also create an Italian based NTSC 16×9 version or a version in a different format for broadcast. With the previously created localized version, it is impossible to utilize the Italian localized master to provide the other broadcast masters. Accordingly, a brand new Italian version must be created from the original domestic source. In the prior art, all of the local versions are ingested and stored. Such creation and processing can be performed today but consumes a large amount of storage and still remains locked to the localized resolution and aspect ratio. Further, while full copies of each version are stored, the majority of content between the different versions is the same.

Accordingly, what is needed is the capability to provide non-destructive file based mastering for multiple languages and versions without consuming a large amount of storage, and additionally permitting the capability of generating a broader range of broadcast masters.

SUMMARY OF THE INVENTION

One or more embodiments of the invention provide the ability to derive a localized version of content from a domestic capture via metadata. Such a capability enables significant savings in storage space with independent resolution and aspect ratio in relation to the original localized video. In other words, multiple different localized deliverables may be driven based on an original domestic source.

BRIEF DESCRIPTION OF THE DRAWINGS

Referring now to the drawings in which like reference numbers represent corresponding parts throughout:

FIG. 2 illustrates a domestic source with textless content and localized video provided in the prior art;

FIG. 3 illustrates part of a localized video creation process where localized video is compared to a domestic source and textless in accordance with one or more embodiments of the invention;

FIG. 4 illustrates a completely cut/realigned localized video compared to a domestic source in accordance with one or more embodiments of the invention;

FIG. 5 illustrates a resulting domestic source and localized video in accordance with one or more embodiments of the invention;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

International File Mastering Components

Figure 1:
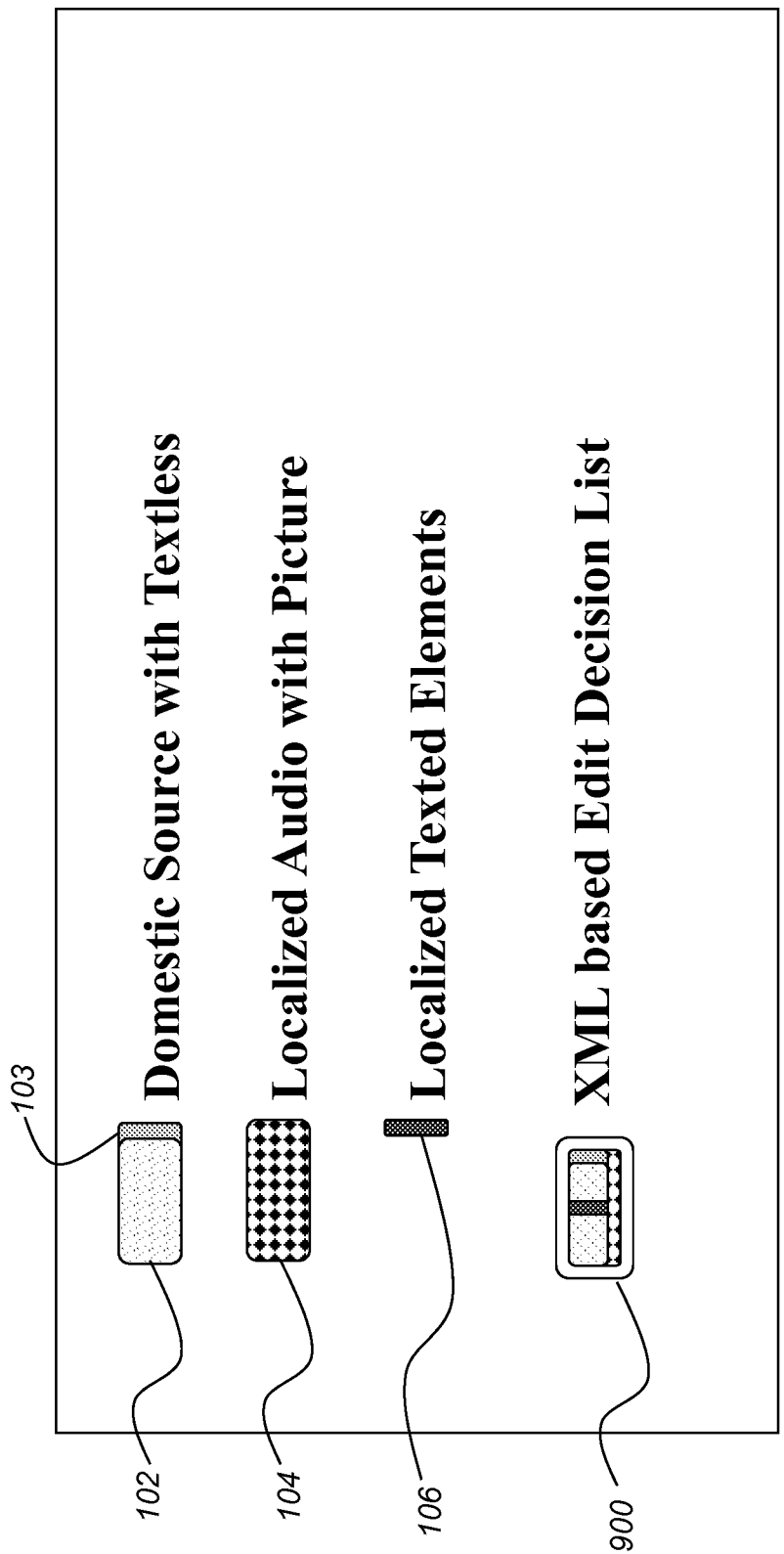
FIG. 1 illustrates the legend for the components utilized in the processing of media content.

To provide international file mastering from a domestic source, four components are utilized as illustrated in FIG. 1: (1) a domestic source 102 with textless content 103 (captured from tape); (2) localized audio with picture (captured from tape) 104; (3) localized texted elements (created during the workflow of the invention) 106; and (4) a Playlist 900 (created during the workflow of the invention).

FIG. 2 illustrates the domestic source 102 with textless content 103 and localized video 302 provided in the prior art and used in embodiments of the present invention. The domestic source 102 (including textless content 103) is captured at a high bit rate (including but not limited to uncompressed content). Additionally, the domestic source 102 may be directly acquired in file-based format, instead of captured from tape. As part of the production process, for every clip that has text/graphics or other extraneous material added as a post-process, a corresponding clip that is "clean", i.e., devoid of any text/graphics or extraneous material is provided at the end of the domestic source 102. This clean version following the domestic source 102 is referred to as "textless" 103. For example, if a clip of the domestic source 102 includes the name of a city or the time of day, the textless 103 would include a clean version of the clip.

When creating a localized version 302 in-territory, a manual edit/replacement is performed by replacing the domestic source clip 102 containing the texted material with a clip generated from the composite of the textless material 103 and new graphics created for the local version 302 (e.g., Italian).

The entire captured show may be used and stored for local in-territory use. Alternatively, a specific localized version/distributable 302 can be created. In one embodiment of the invention, localized video 302 is captured and a low resolution copy of the video is utilized, while the audio is retained in its original format for later reuse.

In the prior art, even if a localized version 302 of domestic source 102 exists, it would often be impossible to drive another format in that same territory from the localized version 302. Instead, the user would be required to go back to the domestic source 102 and recreate a new localized version 302 that would also be stored. It may be noted that such an in-territory version may have all of the same content but just a different format (e.g., aspect ratio or resolution). Rather than utilizing such full captures of each and every localized version 302, embodiments of the invention drive the localized version 302 off of metadata.

To provide such capabilities, a version of the content that is based on the domestic source 102 (i.e., having the domestic resolution, format, etc.) is created to match the localized edited content 302. As can be seen in FIG. 2, the localized content 302 may have a different runtime than that of domestic source 102 due to commercial formatting and censorship edits etc.

FIG. 3 illustrates part of the creation process where the localized video 302 is compared to the domestic source 102 and textless 103 in accordance with one or more embodiments of the invention. As can be seen, the localized video picture 302 is a different length than that of the domestic source 102 because of the localized edits. Such a difference in length may reflect a difference in time and/or size (e.g., if in a different resolution). To generate the desired clip, a determination must be made regarding where the localized video 302 is different from the domestic source 102. Accordingly, the first frame of picture from the domestic 102 and localized capture 302 are lined up and viewed as "picture in picture" 304. As illustrated, the localized video 302 picture is the small picture while the domestic source 102 picture is the large picture.

The time line view (FIG. 3 illustrates a timeline based view of the localized video 302 and domestic source 102/103) is then scrubbed viewing the different pictures until the two pictures are out of synchronization (i.e., until a change in the picture is found). Such a lack of synchronization identifies when (i.e., the location where) there has been an edit in-territory. In this regard, the domestic source 102 has all of the pieces of the in-territory 302 clip because the in-territory localized video 302 was originally created from the domestic source 102. Once the lack of synchronization has been identified, the localized video 302 is cut/bladed and realigned to match the domestic source 102. In other words, the localized video file 302 is cut where it is out of synchronization. The localized video 302 is then searched forward and adjusted in the time-line until it lines up and is synchronized again with the domestic source 102. This process of cutting/realigning continues throughout the entire localized video 302 (i.e., the entire episode/clip of media content), thereby identifying everywhere the in-territory edit has removed a shot/clip from the domestic source 102. Such a cutting/realigning process may be performed manually by the user or may be automated without additional user input. FIG. 4 illustrates a completely cut/realigned localized video 302 compared to the domestic source 102 in accordance with one or more embodiments of the invention.

Once the gaps created in the localized video 302 have been identified, the metadata regarding their location is transposed onto the domestic source 102, thus aligning the domestic source 102 and the localized video 302. In other words, the process identifies the ranges in the domestic source 102 that have been removed by the in-territory edits and removes them from the domestic source 102. It may be noted that such "removal" may be performed in a non-destructive fashion by hiding the ranges using the metadata instead of physically deleting the ranges from the domestic source 102.

Once removed, the sequences are pulled up to remove the gaps in both the domestic source 102 and localized video 302. Thus, the localized video 302 is returned to its original state and the domestic source 102 has been modified to match the localized video 302. FIG. 5 illustrates the resulting domestic source 102 and localized video 302 in accordance with one or more embodiments of the invention.

Figure 6:
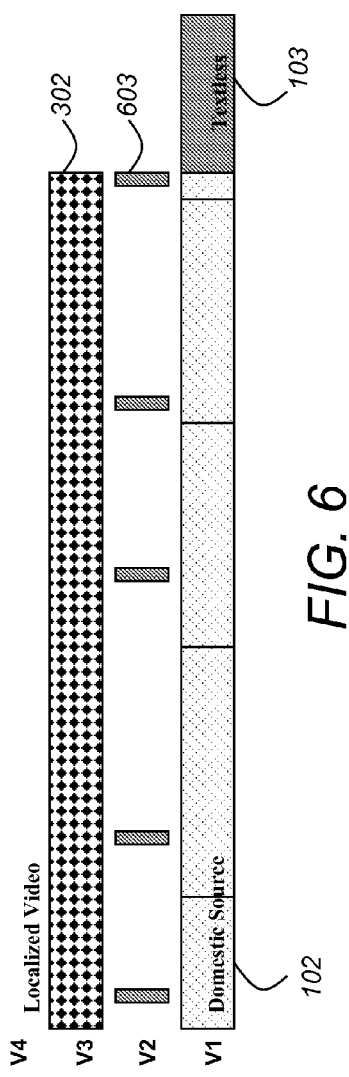
FIG. 6 illustrates the placement of textless shots in accordance with one or more embodiments of the invention.

Once the sequences are pulled together, the result is a partially localized (domestic version 102 bladed to match the localized version 302) version of the show. It is desirable to create a localized texted version of the show (e.g., with Italian subtitles). To create the localized texted version of the show, it is necessary to identify the textless clips 103 that correspond to the texted clips in the domestic source 102, create the texted material for the localized version (e.g., creating Italian subtitles), and then replace the domestic version's texted clip with the new localized texted clip. FIG. 6 illustrates the placement of the textless shots 603 (from textless content 103) in accordance with one or more embodiments of the invention.

Figure 7:
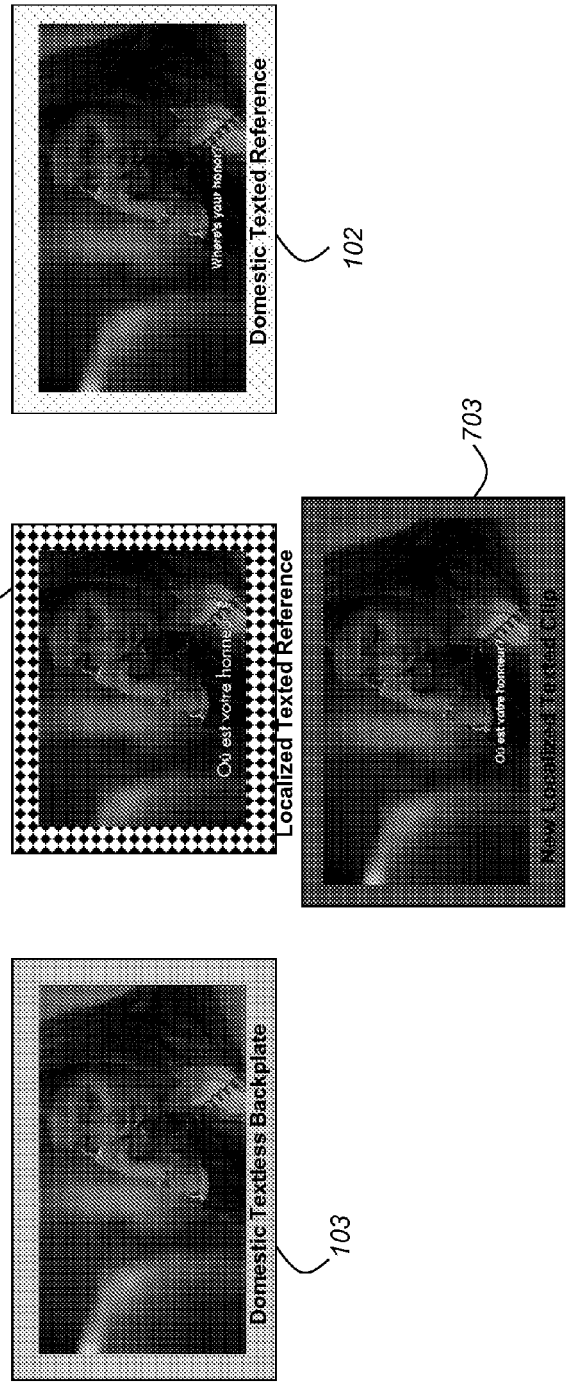
FIG. 7 illustrates the different components of the texting process in accordance with one or more embodiments of the invention.

Once the textless clips have been extracted from the domestic source with Textless 102 and 103, the objective is then to begin the texting process (to create a foreign language based texted version from the domestic textless version). FIG. 7 illustrates the different components of the texting process. Three sources are required to perform the texting process: (1) high bit rate (including but not limited to uncompressed) textless backplate 103 (to build localized text upon); (2) domestic texted reference 102 (timing and animation); and (3) localized texted reference 302 (translation; can be a frame grab). The high bit rate textless backplate 103 is the high bit rate textless content (that has no text) that follows the domestic source 102. The localized texted reference 302, or the domestic source 102 is used to determine the font, animation, size, etc. that is utilized in order to replicate such formatting when creating a new localized texted clip 703. As described above, the localized texted reference 302 is often in a different aspect ratio from the domestic source 102 and may have a different resolution as well. Accordingly, the textless backplate 103 and localized texted reference 302 are used to translate the domestic texted reference 102 to create a new localized texted clip 703 that can be taken back into an editor with a new aspect ratio (e.g., the same as the domestic source 102) to create new deliverables as desired.

Figure 8:
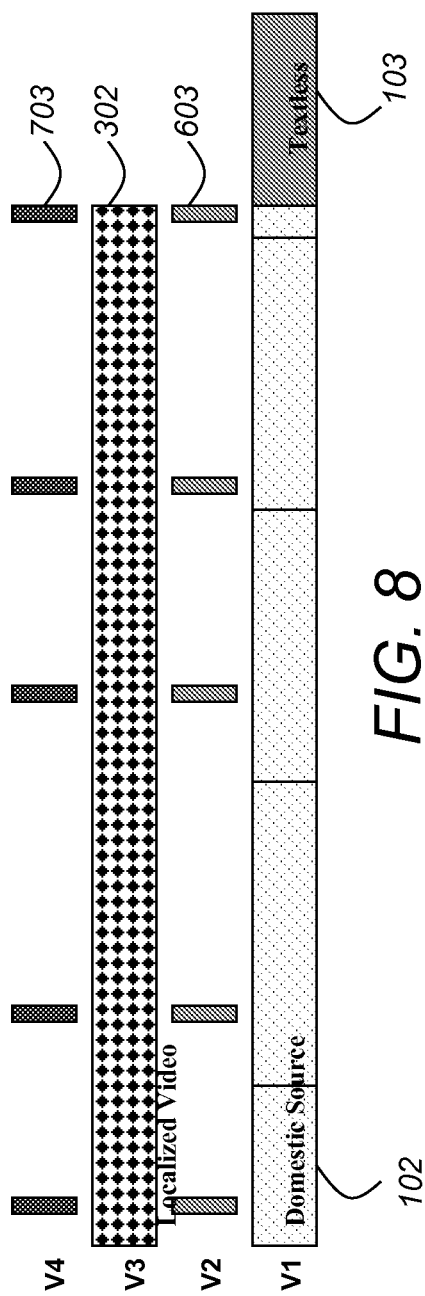
FIG. 8 illustrates the cutting of texted portions of a new localized version that are matched to textless backplate portions in accordance with one or more embodiments of the invention.
Figure 9:
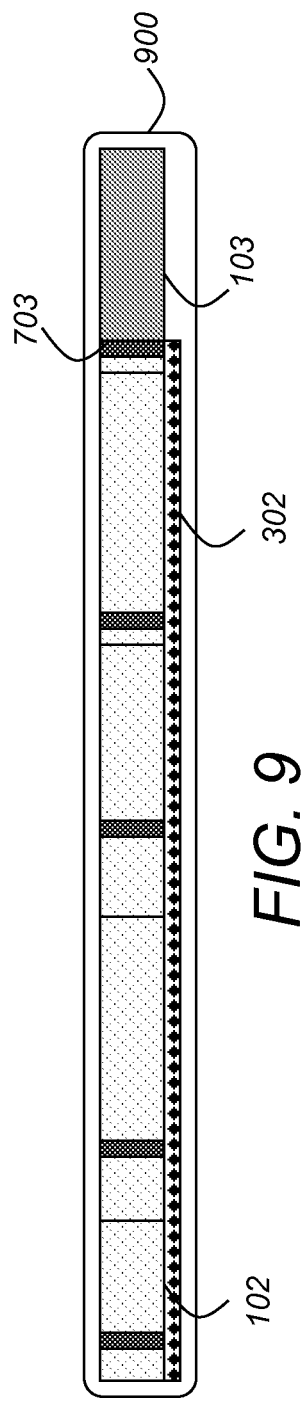
FIG. 9 illustrates the folding of content into a single stream to create a localized show driven by the domestic source in accordance with one or more embodiments of the invention.

Once the new texted clip 703 has been created, it is brought into an editor and the texted portions are dropped in to match the textless backplate portions 603 as illustrated in FIG. 8. At this point, various components that have been utilized to date are no longer needed. The localized picture (i.e., localized video 302) is no longer needed (because the localized video 302 was only used as a guide to re-cut the domestic source 102). In addition, the textless inserts 603 are no longer needed because they were only used as a guide to create the new texted shots 703. Accordingly, all of the remaining content can be combined into a single stream to create a localized representation 900 that is used to create the localized show as illustrated in FIG. 9. This localized representation 900 references the existing domestic capture 102/103, localized audio (part of 302), and texted inserts 703 and contains the metadata derived from the cutting/blading operation described above. Further, metadata may also be additionally defined (e.g., acts/segments/reels/etc.) that refines the edit decision list (EDL) that was generated to create the resulting playlist 900. Further, as illustrated, the playlist 900 can be wrapped as an extensible markup language (XML) based EDL. This XML based EDL can be pushed off to a storage system without rendering a newly created localized video 302.

Media Description

Figure 10:
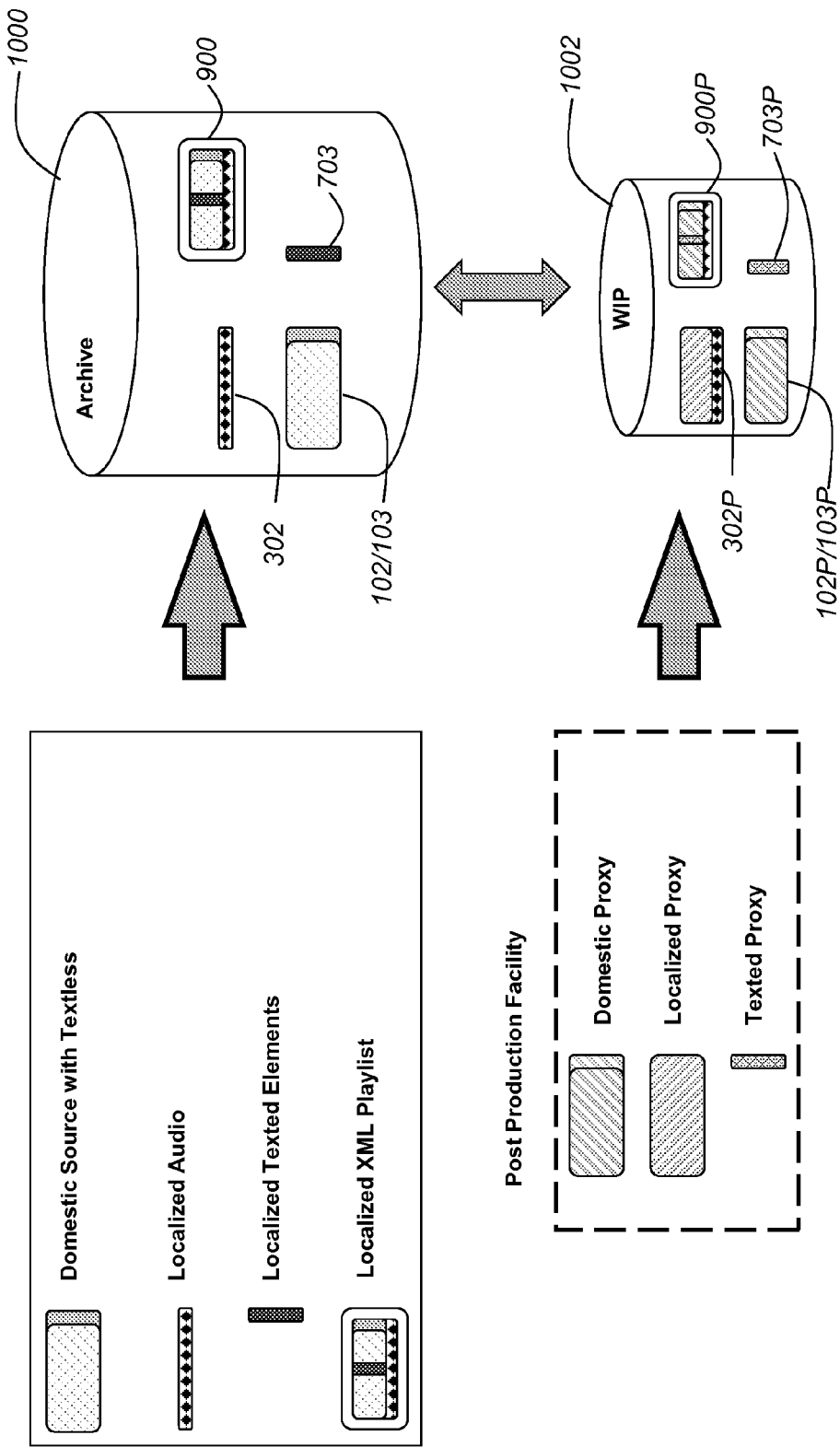
FIG. 10 illustrates an overview of the media utilized in accordance with one or more embodiments of the invention.

In conjunction with the above, various components utilized in the process may be proxies (or compressed versions of the content) instead of the high bit rate versions. Further, different components of the process may be stored in different storage facilities. FIG. 10 illustrates an overview of the media utilized in accordance with one or more embodiments of the invention. The digital archive 1000 contains the high bit rate versions of the various components: the domestic source 102 with textless 103), the localized audio 302, the localized texted elements 703, and the localized XML playlist 900. The XML based EDL playlist 900 is illustrated as a box containing the elements identified. However, it should be noted that the XML based EDL 900 merely references the data and does not include the data itself.

Within a post production facility, processing may be driven from low bit rate proxy files from a Work-In-Progress (WIP) storage 1002. Accordingly, proxy versions (with a suffix of "P") of each of the components may be utilized in the post production process/workflow.

Figure 11:
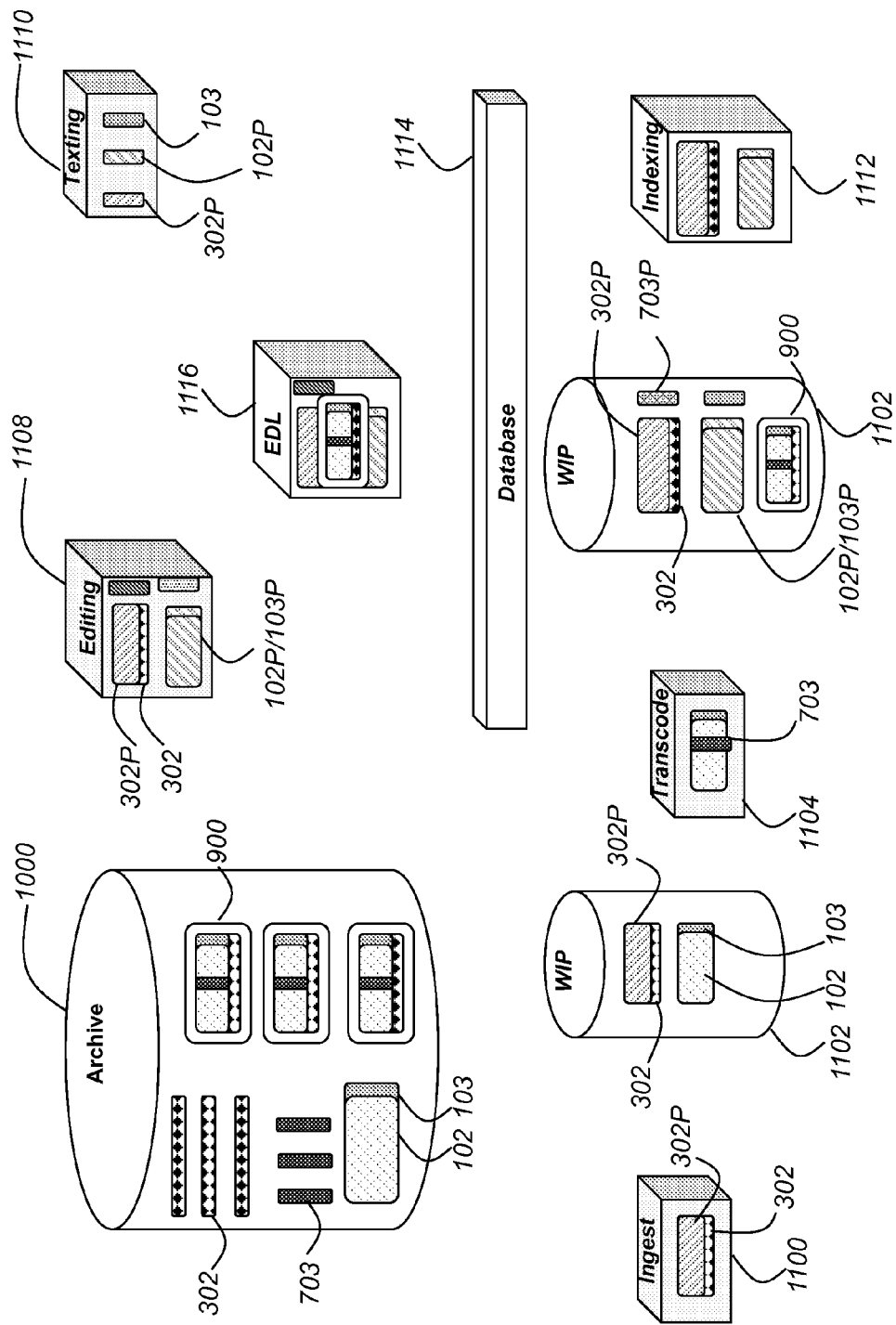
FIG. 11 illustrates the components utilized in the workflow process utilized in accordance with one or more embodiments of the invention.

FIG. 11 illustrates the components utilized in the workflow process in accordance with one or more embodiments of the invention. At 1100, the domestic high bit rate source 102 with textless 103 is ingested from tape and put into WIP storage 1102. This content is then pushed to the digital archive 1000. The localized proxy version of the picture 302P with the uncompressed localized audio 302 is also ingested at 1100 into the WIP Storage 1102. In this regard, the uncompressed audio 302 is utilized while the localized version of the video/picture 302 is not relevant because such video is going to be discarded during the processing. The uncompressed audio 302 is pushed into the archive 1000 and simultaneously brought into the WIP Storage 1102.

The domestic high bit rate source with textless 102/103 is then transcoded (i.e., by transcoder 1104) into a proxy version 102P/103P that is stored in the WIP storage 1102. The high bit rate version 102/103 is no longer needed locally and remains in the archive 1000.

From the WIP storage 1102, the data is used by an editing system 1108 where the cut/blading and other processing is performed (as described above). The texting procedures described above are then performed using texting system 1110. The texting system 1110 utilizes proxy versions of the two reference clips 302P and 102P and the high bit rate textless 103 (extracted from 102 that is resident in the archive), to create a new texted shot 703 that is delivered to the vault 1000. Further, the texting system 1110 utilizes the transcoder 1104 to create a proxy version 703P of the texted shot 703 onto the WIP storage 1102 that is pushed into the editing system 1108 for verification purposes.

The Editing system 1108 is then able to export out the XML based EDL 900. Such an EDL may be created manually or automatically and contains a translation of the timecodes, frame counts, etc. utilized to perform the assemblage of the localized version from the domestic source 102. The XML based EDL 900 is then pushed into the archive 1000 which links/references to the assets residing in the vault 1000.

Additional components 1112-1116 may be used to automate various processes in accordance with one or more embodiments of the invention. The edit decision list (EDL) manager 1116 provides the ability to swap proxy versions with high bit rate material to perform an edit as desired. Database 1114 is used to track the media as it is processed through the different components of FIG. 11. In this regard, database 1114 manages and maintains a mapping of asset identifications (IDs) between proxies and high bit rate material. Indexing component 1112 provides fingerprinting indexing technology and determines the differences between the localized video 302 and domestic source 102 (or proxies for those sources).

As described above, two proxies (i.e., the domestic proxy 102P and localized proxy 302P) are placed in the WIP storage 1102. Instead of pushing those proxies 102P and 302P into the edit system 1108 and performing edits, the indexing component 1112 may be utilized to automatically perform a comparative analysis of the two programs and provide/output metadata that defines where the localized video 302 and the domestic source 102 differ, and where texted shots are located. Based on the performance by the indexing component 1112, a manual comparison and generation of metadata may not be required, or is greatly reduced.

The indexing component 1112 output is pushed to the EDL manager 1116 that feeds into the editing module/editor 1108. The EDL manager 1116 is responsible for tracking edits and where the media lives (i.e., where the different versions are stored) (in combination with the database 1114). In other words, the XML based EDL 900 contains edit decisions and the EDL manager 1116 provides the ability to determine where the media referenced in the EDL is stored within a post production environment (e.g., based on the mapping of IDs stored in the database 1114). Accordingly, the EDL manager 1116 provides the ability to track back to any media that is being created and provides the pieces that are placed into the indexer 1112 so that the data can be resolved to the high bit rate version. The EDL allows a linkage between the EDL and data that is driven by asset IDs to resolve the data easily.

Continuing with the process described above, once the editor 1108 has performed the various cuts and the texting component 1110 has created the new texted shot 703, the new shot 703 may be transcoded by transcoder 1104 into a proxy 703P within the WIP 1102. The proxy 703P is fed into the EDL manager 1116 before it is processed by the editor 1108. The editor 1108 performs any additional editing that needs to be performed enabling the EDL manager 1116 to export the XML based EDL 900P that references all of the proxies (102P/103P, 302P, and 703P) stored in the WIP 1102. Based on the mapping of IDs stored in the database 1114, the references to the proxies (102P/103P, 302P, and 703P) in the XML based EDL 900P are replaced with references to the high bit rate version stored in the archive 1000 to create the XML based EDL 900. As new localized versions are processed and arrive in the archive 1000 (where they are resolved against the proxy versions), the archive only needs to store the audio 302, the texted shot 703, and the XML based EDLs 900.

Logical Flow

Figure 13:
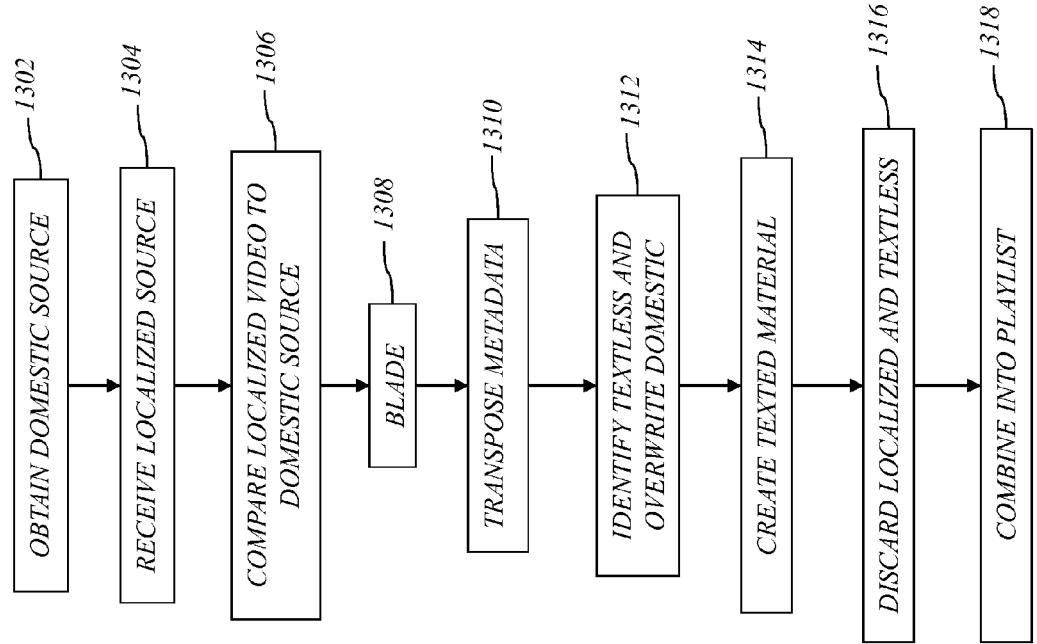
FIG. 13 is a flow chart illustrating the logical flow for non-destructively generating a file based master in accordance with one or more embodiments of the invention.

FIG. 13 is a flow chart illustrating the logical flow for non-destructively generating a file based master in accordance with one or more embodiments of the invention.

At step 1302, a domestic source with textless content is obtained. The domestic source includes domestic audio content and domestic video content. The textless content includes portions of the domestic source that are devoid of text. In addition, the domestic source with textless content includes uncompressed content. Further, such domestic source may be directly acquired in a file-based format.

At step 1304, a localized source is received. The localized source has localized audio content and localized video content. Further, the localized source is based on the domestic source. In addition, the localize source may include a localized version that is in a different format from that of the domestic source (e.g., different resolution and/or aspect ratio).

At step 1306, the localized video is compared to the domestic source to determine where the localized video is different than the domestic source.

At step 1308, the localized video is bladed and realigned with the domestic source at the identified different locations.

At step 1310, metadata regarding the determined different locations is transposed onto the domestic source. Such transposing may be performed in a non-destructive manner by hiding the determined different locations of the domestic source using the metadata instead of physically deleting the determined different locations from the domestic source.

At step 1312, portions of the textless content that correspond to texted portions in the domestic source are identified. Thereafter, the texted portions in the domestic source are obscured by the corresponding portions of textless content, on a separate video track.

At step 1314, texted material that is based on the localized video and the texted portions is created.

At step 1316, the localized video content and the textless content are discarded.

At step 1318, the localized audio content, the create texted material, and the metadata are combined into a playlist that represents a localized file based master. The metadata in the playlist may include a refined edit decision list that is used to create the playlist (i.e., an EDL that can be used to performing the editing set forth in the above-described steps).

In addition to the above, various embodiments may use a digital archive as well as a work-in-progress storage unit to perform the processing of one or more of the steps. For example, the domestic source, the localized audio, the texted material and the playlist may be stored in the digital archive. In addition, a proxy version of files with a lower bit rate than those stored in the digital archive may be stored in the WIP storage which is used (e.g., by an editing system) to perform the steps 1302-1318. Accordingly, the WIP may be used to store a proxy domestic source (containing a low-bit rate version of the domestic source) as well as the localized audio in an uncompressed form that may then be used by various system components. For example, the blading using a proxy domestic source and localized audio in the WIP may be performed by an editing system.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention. Accordingly, embodiments of the invention may be implemented as a method, apparatus, system, and/or article of manufacture that is used to perform non-destructive file based mastering for multiple languages and versions.

In view of the above description, embodiments of the invention provide for the generation of metadata (i.e., the XML based EDL 900) that is used to derive a localized version from a domestic source (i.e., source 102/103). Further, the derivation of the metadata 900 (that is used to generate a localized version of a domestic source) is driven utilizing proxies instead of working with an entire high bit rate version of the data.

In addition, the extraction and generation of high resolution localized texted material (i.e., a localized texted version from the resolution and format of the domestic source) is provided by differencing domestic and localized versions and extracting from the domestic source. In this regard, while the proxy versions are utilized to perform the processing (i.e., the English and localized versions are referenced from the proxies), to obtain the actual texted localized version 703, the content is extracted from a high bit rate element that resides in an archive 1000. Accordingly, once the high resolution localized texted version has been created, many additional distributables based on that localized version can easily be generated (e.g., for broadcast distribution, mobile distribution, Internet based viewing, large venue projection, etc.). Also, the indexing component 1112 enables dynamic processing. In this regard, the texted and textless proxies are used, exported, and the EDL manager 1116 is used to reference the high bit rate version to perform edits dynamically.

Figure 12:
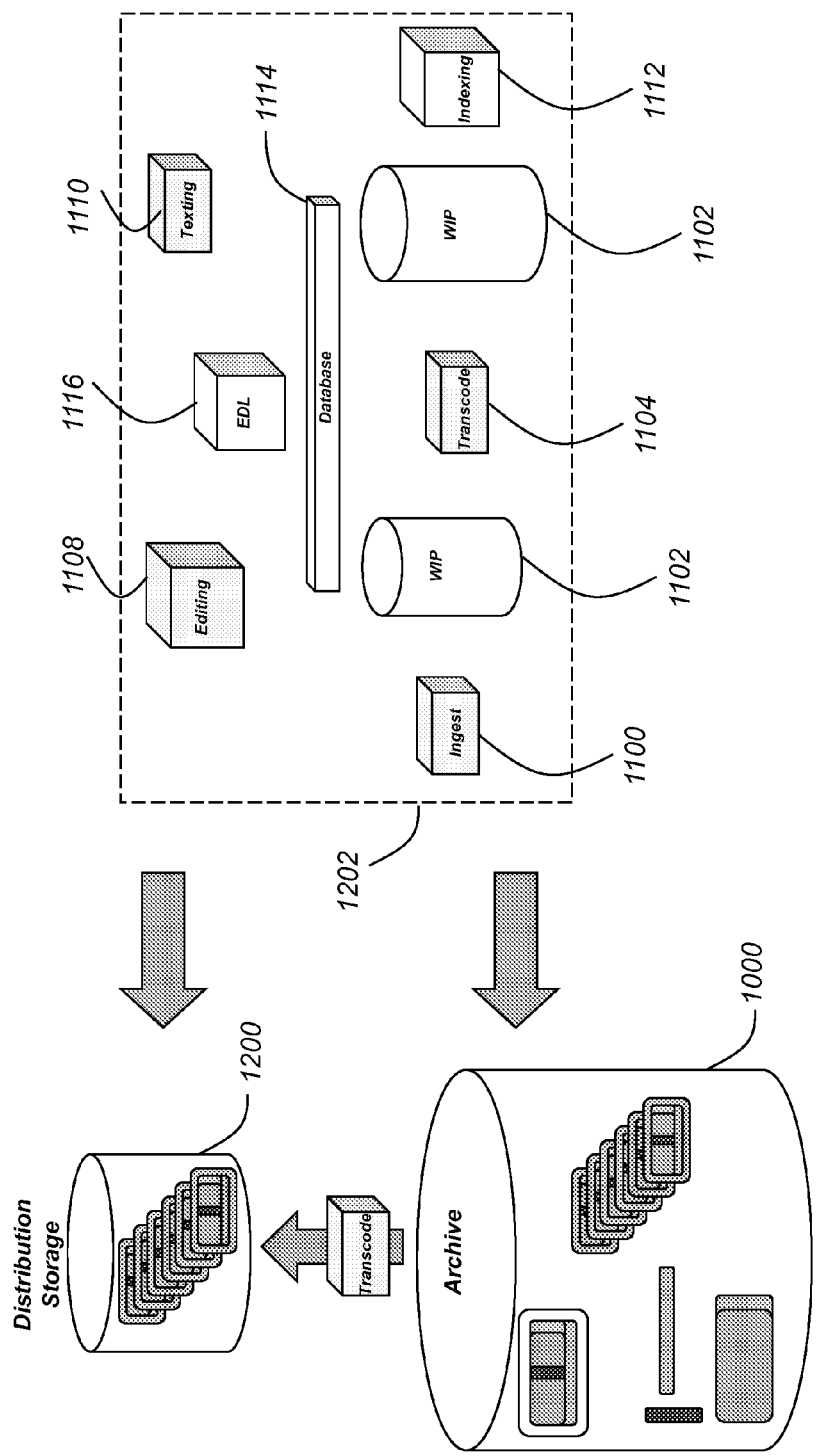
FIG. 12 illustrates the delivery overview utilizing the components of FIG. 11 into a distribution system containing localized content in accordance with one or more embodiments of the invention.

Embodiments of the invention further provide for the generation of a localized version (that is placed in a distribution system) from a purely metadata driven play list 900. FIG. 12 illustrates the delivery overview utilizing the components of FIG. 11 into a distribution system/storage 1200 containing localized content. Once all the different local versions represented in the playlists 900 have been generated, another storage pool system, the distribution system 1200, may be utilized to deliver the files to broadcasters. All of the different XML based EDLs 900 are used to generate the localized versions/renditions that are then transcoded for delivery to the distribution system 1200. This distribution system 1200 may discard the localized versions/renditions since it does not have the capacity of the archive 1000. If needed again, the data may simply be transferred from the archive 1000 to the distribution system 1200.

Alternatively, the distribution system 1200 may utilize the XML based EDLs 900 to generate the localized versions on the distribution system 1200 itself (utilizing a domestic source 102 that resides in/on the distribution system 1200). In such an embodiment, the post production processing facility 1202 would not need to perform any additional processing.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A computer implemented method for non-destructively generating a file based master comprising:
   (a) obtaining a domestic source with textless content, wherein:
      (i) the domestic source comprises domestic audio content and domestic video content;
      (ii) the textless content comprises one or more portions of the domestic source that is devoid of text;
   (b) receiving a localized source, comprised of localized audio content and localized video content, based on the domestic source;
   (c) comparing the localized video to the domestic source to determine where the localized video is different than the domestic source;
   (d) blading the localized video and realigning the localized video with the domestic source at the determined different locations;
   (e) transposing metadata regarding the determined different locations onto the domestic source;
   (f) identifying portions of the textless content that correspond to texted portions in the domestic source, and cutting and overwriting the texted portions in the domestic source with the corresponding portions of textless content;
   (g) creating texted material based on the localized video and the texted portions;
   (h) discarding the localized video content and the textless content; and
   (i) combining the localized audio content, the created texted material, the domestic source, and the metadata into a playlist that represents a localized file based master.

2. The computer-implemented method of claim 1, wherein the domestic source with textless content comprises uncompressed content.

3. The computer-implemented method of claim 1, wherein the domestic source is directly acquired in a file-based format.

4. The computer-implemented method of claim 1, wherein the localized source comprises a localized version in a different format from that of the domestic source.

5. The computer-implemented method of claim 1, wherein the transposing is performed in a non-destructive manner by hiding the determined different locations of the domestic source using the metadata instead of physically deleting the determined different locations from the domestic source.

6. The computer-implemented method of claim 1, wherein the metadata in the playlist comprises a refined edit decision list that is used to create the playlist.

7. The computer-implemented method of claim 1, further comprising storing, in a digital archive, the domestic source, the localized audio, the texted material, and the playlist.

8. The computer-implemented method of claim 7, wherein a proxy version, stored in a work-in-progress (WIP) storage, of files with a lower bit rate than those stored in the digital archive, are used to perform one or more of the steps (a)-(i).

9. The computer-implemented method of claim 8, wherein the WIP is used to store:
   a proxy domestic source comprised of a low-bit rate version of the domestic source; and
   the localized audio in an uncompressed form.

10. The computer-implemented method of claim 8, wherein an editing system performs the blading using the proxy domestic source and localized audio in the WIP storage.

11. A system for non-destructively generating a file based master in a computer system comprising:
   (a) a computer having a memory;
   (b) an application executing on the computer, wherein the application is configured to:
      (i) obtain a domestic source with textless content, wherein:
         (1) the domestic source comprises domestic audio content and domestic video content;
         (2) the textless content comprises one or more portions of the domestic source that is devoid of text;
      (ii) receive a localized source, comprised of localized audio content and localized video content, based on the domestic source;
      (iii) compare the localized video to the domestic source to determine where the localized video is different than the domestic source;
      (iv) blade the localized video and realigning the localized video with the domestic source at the determined different locations;
      (v) transpose metadata regarding the determined different locations onto the domestic source;
      (vi) identify portions of the textless content that correspond to texted portions in the domestic source, and obscuring the texted portions in the domestic source with the corresponding portions of textless content;
      (vii) create texted material based on the localized video and the texted portions;
      (viii) discard the localized video content and the textless content; and
      (ix) combine the localized audio content, the created texted material, the domestic source, and the metadata into a playlist that represents a localized file based master.

12. The system of claim 11, wherein the domestic source with textless content comprises uncompressed content.

13. The system of claim 11, wherein the domestic source is directly acquired in a file-based format.

14. The system of claim 11, wherein the localized source comprises a localized version in a different format from that of the domestic source.

15. The system of claim 11, wherein the application is configured to perform the transposing in a non-destructive manner by hiding the determined different locations of the domestic source using the metadata instead of physically deleting the determined different locations from the domestic source.

16. The system of claim 11, wherein the metadata in the playlist comprises a refined edit decision list that is used to create the playlist.

17. The system of claim 11, wherein the application is further configured to store, in a digital archive, the domestic source, the localized audio, the texted material, and the playlist.

18. The system of claim 17, wherein a proxy version, stored in a work-in-progress (WIP) storage, of files with a lower bit rate than those stored in the digital archive, are used to perform one or more of the steps (i)-(ix).

19. The system of claim 18, wherein the WIP is used to store:
- a proxy domestic source comprised of a low-bit rate version of the domestic source; and
- the localized audio in an uncompressed form.

20. The system of claim 18, further comprising an editing system that is configured to perform the blading using the proxy domestic source and localized audio in the WIP storage.

21. A non-transitory computer readable storage medium encoded with computer program instructions which when accessed by a computer cause the computer to load the program instructions to a memory therein creating a special purpose data structure causing the computer to operate as a specially programmed computer, executing a method of non-destructively generating a file based master, comprising:

(a) obtaining, in the specially programmed computer, a domestic source with textless content, wherein:
  (i) the domestic source comprises domestic audio content and domestic video content;
  (ii) the textless content comprises one or more portions of the domestic source that is devoid of text;
(b) receiving, in the specially programmed computer, a localized source, comprised of localized audio content and localized video content, based on the domestic source;
(c) comparing, in the specially programmed computer, the localized video to the domestic source to determine where the localized video is different than the domestic source;
(d) blading, in the specially programmed computer, the localized video and realigning the localized video with the domestic source at the determined different locations;
(e) transposing, in the specially programmed computer, metadata regarding the determined different locations onto the domestic source;
(f) identifying, in the specially programmed computer, portions of the textless content that correspond to texted portions in the domestic source, and obscuring the texted portions in the domestic source with the corresponding portions of textless content;
(g) creating, in the specially programmed computer, texted material based on the localized video and the texted portions;
(h) discarding, in the specially programmed computer, the localized video content and the textless content; and
(i) combining, in the specially programmed computer, the localized audio content, the created texted material, the domestic source, and the metadata into a playlist that represents a localized file based master.

* * * * *